United States Patent
Shim et al.

(10) Patent No.: US 11,757,364 B2
(45) Date of Patent: Sep. 12, 2023

(54) PARALLEL INTERLEAVING OPERATED BIDIRECTIONAL DC-DC CONVERTER AND METHOD AND APPARATUS FOR CONTROLLING THE SAME

(71) Applicant: HYUNDAI MOBIS Co., Ltd., Seoul (KR)

(72) Inventors: Hyun Woo Shim, Suwon-si (KR); Deok Kwan Choi, Yongin-si (KR); Won Gon Kim, Yongin-si (KR); Min Heo, Seongnam-si (KR); Kang Min Kim, Seoul (KR); A Ra Lee, Seongnam-si (KR); Tae Ho Bang, Seoul (KR); Ji Hoon Park, Suwon-si (KR); Du Ho Kim, Yongin-si (KR); Soo Min Jeon, Yongin-si (KR)

(73) Assignee: HYUNDAI MOBIS Co., Ltd., Seoul (KR)

(*) Notice: Subject to any disclaimer, the term of this patent is extended or adjusted under 35 U.S.C. 154(b) by 0 days.

(21) Appl. No.: 17/532,494

(22) Filed: Nov. 22, 2021

(65) Prior Publication Data

US 2022/0166332 A1    May 26, 2022

(30) Foreign Application Priority Data

Nov. 23, 2020    (KR) .................... 10-2020-0158123

(51) Int. Cl.
*H02M 3/335*    (2006.01)
*B60L 53/20*    (2019.01)
(Continued)

(52) U.S. Cl.
CPC ......... *H02M 3/33584* (2013.01); *B60L 53/20* (2019.02); *B60L 58/20* (2019.02);
(Continued)

(58) Field of Classification Search
CPC .. H02M 3/33584; H02M 1/0009; H02M 1/15; H02M 1/32; H02M 1/342;
(Continued)

(56) References Cited

U.S. PATENT DOCUMENTS

| 2017/0012536 A1* | 1/2017 | Lin ...................... H02M 3/285 |
| 2019/0157986 A1* | 5/2019 | Ginart .................. H02M 3/158 |
| 2022/0021298 A1* | 1/2022 | Luo .................... H02M 3/33571 |

FOREIGN PATENT DOCUMENTS

| KR | 20160049334 A | * 10/2014 | ........... G01R 31/327 |
| KR | 20180041908 A | * 10/2016 | .............. B60L 11/18 |

OTHER PUBLICATIONS

Translation of KR20160049334 (Year: 2014).*
Translation of KR20180041908A (Year: 2016).*

* cited by examiner

*Primary Examiner* — Elim Ortiz
(74) *Attorney, Agent, or Firm* — Morgan, Lewis & Bockius LLP

(57) ABSTRACT

The present disclosure relates to a new bidirectional low voltage DC-DC converter (LDC), that is, a DC-DC converter capable of satisfying a safety level required for an eco-friendly vehicle and an autonomous vehicle and improving power conversion performance, and a method and an apparatus for controlling the same. The LDC proposed in the present disclosure is a new concept bidirectional LDC in which a plurality of converters having the same power circuit topology are subjected to a parallel interleaving operation so as to enable both a buck operation and a boost operation, satisfy a high safety level, and improve power conversion performance. To this end, a plurality of bidirectional active-clamp flyback converters (for example, two or more bidirectional active-clamp flyback converters) are con-
(Continued)

nected in parallel and are interleaved and controlled by a controller (for example, a microcomputer).

17 Claims, 11 Drawing Sheets

(51) Int. Cl.
*H02M 1/00* (2006.01)
*B60L 58/20* (2019.01)

(52) U.S. Cl.
CPC ....... *H02M 1/0009* (2021.05); *B60L 2210/12* (2013.01); *B60L 2210/14* (2013.01); *H02M 3/3353* (2013.01)

(58) Field of Classification Search
CPC .. H02M 3/285; H02M 1/0043; H02M 3/3353; B60L 53/20; B60L 2210/12; B60L 2210/14; B60L 3/003; B60L 3/0092; B60L 3/04; B60L 58/20
See application file for complete search history.

PARALLEL INTERLEAVING OPERATED BIDIRECTIONAL DC-DC CONVERTER AND METHOD AND APPARATUS FOR CONTROLLING THE SAME

CROSS-REFERENCE TO RELATED APPLICATIONS

This application claims the benefit under 35 U.S.C. § 119(a) of Korean Patent Application No. 10-2020-0158123, filed on Nov. 23, 2020 in the Korean Intellectual Property Office, the entire disclosure of which is incorporated herein by reference for all purposes.

BACKGROUND

1. Technical Field

The present disclosure relates to a low voltage DC-DC converter (LDC) (also known as a DC-DC converter), which is a direct current power supply device used in an eco-friendly vehicle, and more particularly, a technique for controlling the same, in which a high voltage is converted into a low voltage (buck mode) and a low voltage is converted into a high voltage (boost mode).

2. Discussion of Related Art

Recently, low voltage DC-DC converters (LDCs), which are DC power supply devices applied to eco-friendly vehicles (hybrid electric vehicle (HEV), plug-in hybrid electric vehicle (PHEV), electric vehicle (EV), and fuel cell vehicle (FCV)) by replacing alternators of internal combustion engines, are essential devices which receive high voltage battery power (for example, 180V to 450V) to charge a low voltage battery (for example, a 12V battery) or to supply power required for electrical components.

Internal components of an LDC mainly include power conversion components at a high voltage side, power conversion components at a low voltage side, and magnetic components serving for power transmission and electrical insulation between the high voltage side and the low voltage side. Existing LDCs require a unidirectional function of receiving power from a high voltage battery HVB installed in a vehicle and outputting power to a low voltage stage (with a level of 12V) through an internal power conversion process.

Recently, users have demanded LDCs which enable bidirectional power conversion in order to respond to autonomous vehicles and have a high safety level (Automotive Safety Integrity Level (ASIL-D)). That is, the users have demanded bidirectional LDCs capable of transmitting power from a low voltage side to a high voltage side (boost) as well as transmitting power from a high voltage side to a low voltage side (buck), which is a function of existing unidirectional LDCs. Through such a bidirectional LDC, it is possible that a DC link capacitor at a high voltage stage is charged (an initial charging circuit of an existing high voltage DC link capacitor can be omitted), a high voltage battery is charged in case of emergency (over-discharge of a high voltage battery can be temporarily coped with), and a low voltage battery (over-discharge or degradation) is self-diagnosed.

Since LDCs, which supply power to electrical components in a vehicle, will be required to have the highest safety level in autonomous driving in the future, the LDCs should be designed to perform essential functions even in a fault situation. In addition, there is a need for performance improvement such as reductions in ripples of an output voltage and an output current.

SUMMARY

The present disclosure is directed to providing a new bidirectional low voltage DC-DC converter (LDC) (or a DC-DC converter) capable of satisfying the above-described safety level required for an eco-friendly vehicle and an autonomous vehicle and improving power conversion performance and a method and apparatus for controlling the same.

An LDC proposed in the present disclosure is a new concept bidirectional LDC in which a plurality of bidirectional DC-DC converters (hereinafter, referred to as "converters") having the same power circuit topology are subjected to a parallel interleaving operation so as to enable both a buck operation and a boost operation, satisfy a high safety level, and improve power conversion performance. To this end, a plurality of bidirectional active-clamp flyback converters (for example, two or more bidirectional active-clamp flyback converters) are connected in parallel and are interleaved and controlled by a controller (for example, a microcomputer).

In a bidirectional active-clamp flyback converter applied to the present disclosure, an applied number of power semiconductors can be minimized as compared with other isolated topologies so that the bidirectional active-clamp flyback converter can be implemented at a low price. In addition, since the maximum switching duty of a power semiconductor is 50% or more (up to 75%), a bidirectional operation is possible in a wide input/output voltage range of a converter. However, since the loss and noise of a power semiconductor are relatively increased as the output capacity of a converter is increased as compared with other topologies, there are disadvantages in terms of efficiency and stability of output power. An LDC proposed in the present disclosure is an LDC having a new structure in which a plurality of converters (for example, three converters) are subjected to a parallel interleaving operation to compensate for the disadvantages of the active-clamp flyback converter described above.

Specifically, according to an aspect of the present disclosure, there is a provided a parallel interleaving operated bidirectional LDC which is a direct current power supply device for a vehicle, the parallel interleaving operated bidirectional LDC including two or more bidirectional DC-DC converters connected in parallel between a high voltage battery and a low voltage battery, wherein switching of a power semiconductor included in each of the bidirectional DC-DC converters is interleaved and controlled to perform a buck mode operation or a boost mode operation.

Interleaving control of the bidirectional DC-DC converters connected in parallel may be performed by a microcomputer and a microprogram.

According to another aspect of the present disclosure, there are provided a method and an apparatus of controlling two or more a parallel interleaving operated bidirectional DC-DC converters connected in parallel between a high voltage battery and a low voltage battery, wherein switching of a power semiconductor included in each of the bidirectional low voltage DC-DC converters connected in parallel is interleaved and controlled to perform a buck mode operation or a boost mode operation.

The above-described configurations and operations of the present disclosure will become more apparent from embodiments described in detail below with reference to the drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

The advantages and features of the present disclosure and methods for accomplishing the same will be more clearly understood from embodiments to be described in detail below with reference to the accompanying drawing. However, the present disclosure is not limited to the following embodiments but may be implemented in various different forms. Rather, these embodiments are provided only to complete the disclosure of the present disclosure and to allow those skilled in the art to understand the category of the present disclosure. The present disclosure is defined by the category of the claims. In addition, terms used in this specification are to describe the embodiments and are not intended to limit the present disclosure. As used herein, singular expressions, unless defined otherwise in context, include plural expressions. It will be further understood that the terms "comprises," "comprising," "includes," and/or "including," when used herein, specify the presence of stated elements, steps, operations, and/or components but do not preclude the presence or addition of one or more other elements, steps, operations, and/or components. Hereinafter, exemplary embodiments of the present disclosure will be described in detail with reference to the accompanying drawings. Moreover, in describing the embodiments, detailed descriptions related to well-known functions or configurations will be ruled out in order not to unnecessarily obscure subject matters of the present disclosure.

Figure 1:
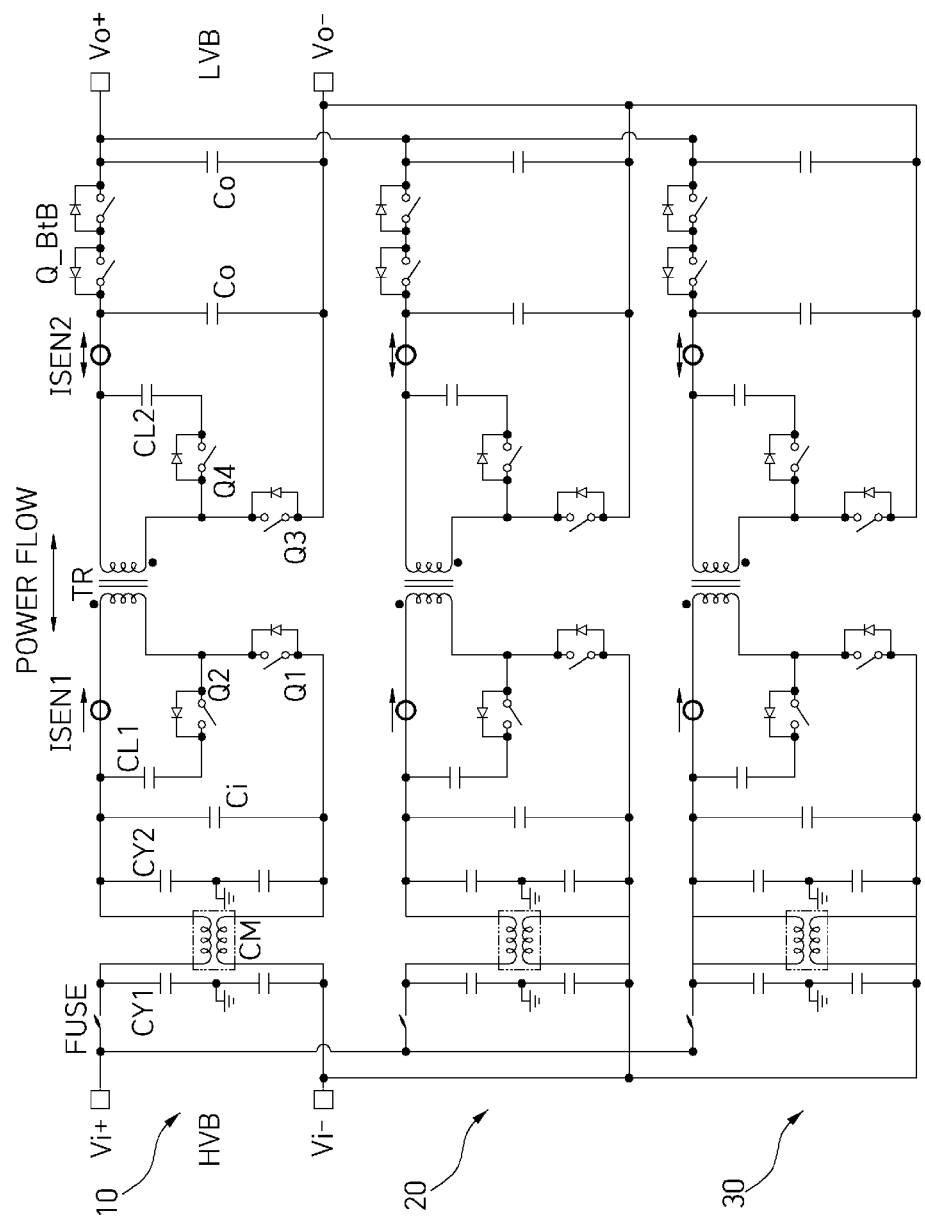
FIG. 1 is a circuit diagram of a parallel interleaving operated bidirectional low voltage DC-DC converter (LDC) according to one embodiment of the present disclosure.

FIG. 1 is a circuit diagram of a parallel interleaving operated bidirectional low voltage DC-DC converter (LDC) according to one embodiment of the present disclosure. FIG. 1 illustrates an embodiment in which three identical bidirectional active-clamp flyback converters 10, 20, and 30 are connected in parallel and interleaved and operated by a control device such as a microcomputer.

The three (limited to the embodiment of FIG. 1) bidirectional active-clamp flyback converters 10, 20, and 30 are connected in parallel, and the switching of a power semiconductor of each converter is interleaved and controlled by a program of the microcomputer (for example, a microprogram) on a time axis. Since three converters are subjected to a parallel interleaving operation, microcomputer hardware and microprogram software can be designed such that, even when one converter fails, the remaining converters can perform essential functions, and whether a specific converter fails can be easily checked by comparing detected current and voltage values of parallel converters, thereby satisfying the highest safety level required for LDCs. In addition, ripples of an output voltage and an output current are reduced.

In a power conversion operation mode of each of the bidirectional active-clamp flyback converters connected in parallel in FIG. 1, there are a buck mode and a boost mode. A double-headed arrow indicating "Power flow" is illustrated at an upper side of FIG. 1 to indicate that a bidirectional power conversion operation of the buck mode and the boost mode are performed.

Buck mode operation: high voltage battery (active-clamp flyback converter using Q1 and Q2)→low voltage battery (synchronous rectifier using Q3).

Boost mode operation: low voltage battery (active-clamp flyback converter using Q3 and Q4)→high voltage battery (synchronous rectifier using Q1).

Main components of each of the bidirectional active-clamp flyback converters 10, 20, and 30 illustrated in FIG. 1 are as follows (the same for reference numerals 10, 20, and 30).

Figure 2:
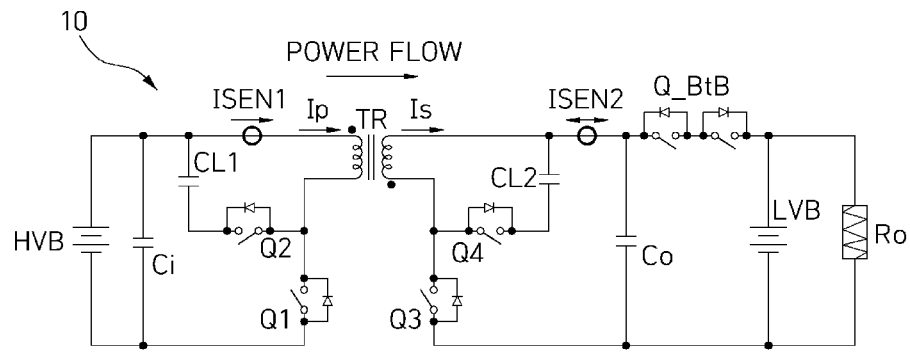
FIG. 2 is a circuit diagram of one converter (10) among three parallel-connected converters when the parallel interleaving operated bidirectional LDC according to the embodiment illustrated in FIG. 1 operates in a buck mode.

HVB: vehicle-mounted high voltage battery (e.g., 400 V)
LVB: vehicle-mounted low voltage battery (e.g., 12 V)
FUSE: high voltage stage protection fuse (separated from other converters in case of failure)
Q_BtB: power semiconductor for low voltage stage protection (separated from other converters in case of failure)
ISEN1: sensor configured to sense high voltage stage current of each converter in buck mode
ISEN2: sensor configured to sense bidirectional low voltage stage current FIG. 2 is a circuit diagram of one converter 10 among three parallel-connected converters when the parallel interleaving operated bidirectional LDC according to the embodiment illustrated in FIG. 1 operates in a buck mode (and is a circuit diagram illustrating only core components of a circuit illustrated in FIG. 1). An arrow indicating "Power flow" is illustrated in a low voltage direction at an upper side to indicate that a buck power conversion mode is performed.

A buck mode operation is an operation in which a power of a high voltage battery HVB is received, the received power is subjected to a power conversion process in a circuit inside the LDC to generate lowered power, and the lowered power is output to a low voltage battery (with a level of 12 V).

As illustrated in FIG. 2, an LDC power is applied from HVB during the buck mode operation. A current Ip of a transformer TR at a high voltage stage may be detected through a current sensor ISEN1 to prevent transformer saturation, and a current Is at a low voltage stage may be detected through a current sensor ISEN2 and used to control an output current limit.

A microcomputer controls power semiconductors Q1 and Q2 at the high voltage stage to be complementarily switched while having a dead-time so that an alternating current (AC) is transmitted to the transformer TR. Magnetization energy stored in the transformer TR flows through a power semiconductor Q3 at a secondary side and generates a DC voltage together with an output capacitor Co. During the buck mode operation, Q4 remains in a turned-off state.

Figure 3:
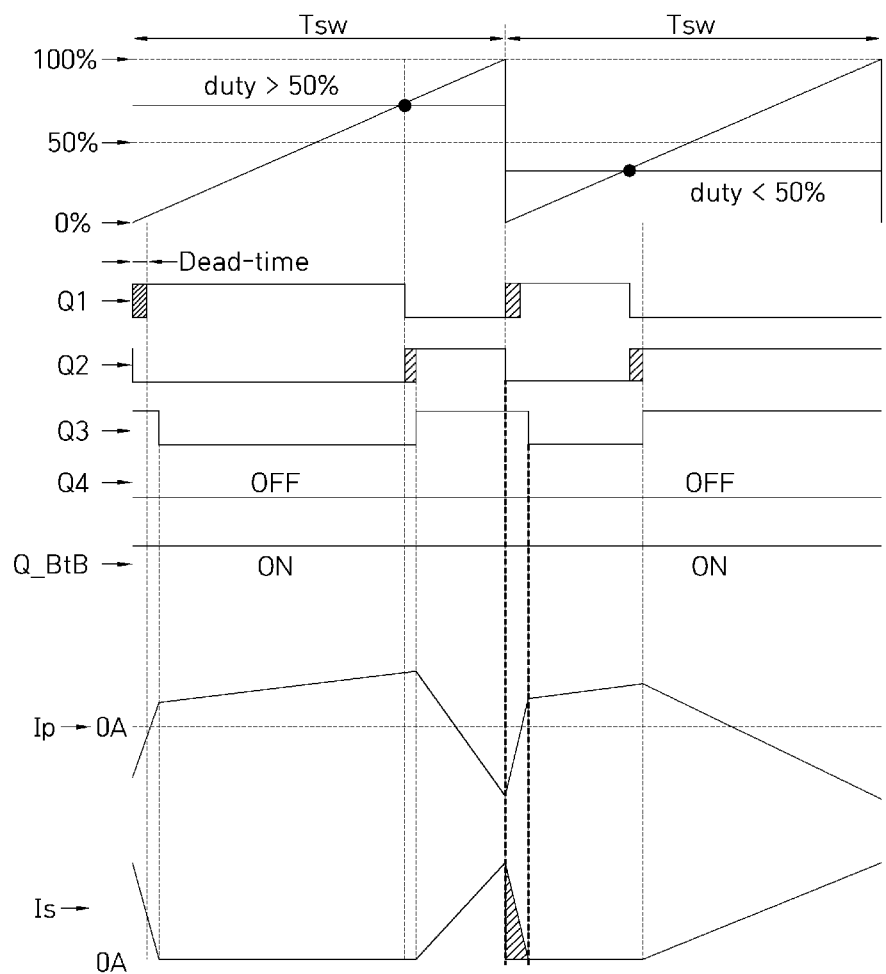
FIG. 3 illustrates an operation timing and current values (Ip) and (Is) of each power semiconductor in a circuit of FIG. 2.

An operation timing and current values Ip and Is of each power semiconductor in the circuit of FIG. 2 are illustrated in FIG. 3. As illustrated in FIG. 3, according to an embodiment of the present disclosure, since an operation is possible even at a duty of 50% or more of an entire switching period Tsw, a wide input voltage range can be provided when the power semiconductor is designed in consideration of a maximum current.

Q3 is used for synchronous rectification of the low voltage stage, and the efficiency of the LDC varies greatly according to a switching timing. Basically, Q3 may perform a switching operation in synchronization with Q2. As can be seen from a waveform of the current Is at the low voltage stage in FIG. 3, when a switching timing of Q3 is controlled to be slightly later than that of Q2, while a current is decreased, a rectification section with a diode can be reduced, thereby further increasing efficiency. Therefore, a method of turning Q3 off using a low voltage stage current value detected by the sensor ISEN2 when a current becomes zero amperes (A) is a method of maximizing efficiency.

Q_BtB may always be turned on in a normal situation and may be turned off in a fault situation such as an overvoltage or an overcurrent of the low voltage stage to protect the remaining circuit at a front stage. In addition, by separating other two converters 20 and 30, the separated converters 20 and 30 may serve as the LDC even in a fault situation.

Figure 4A:
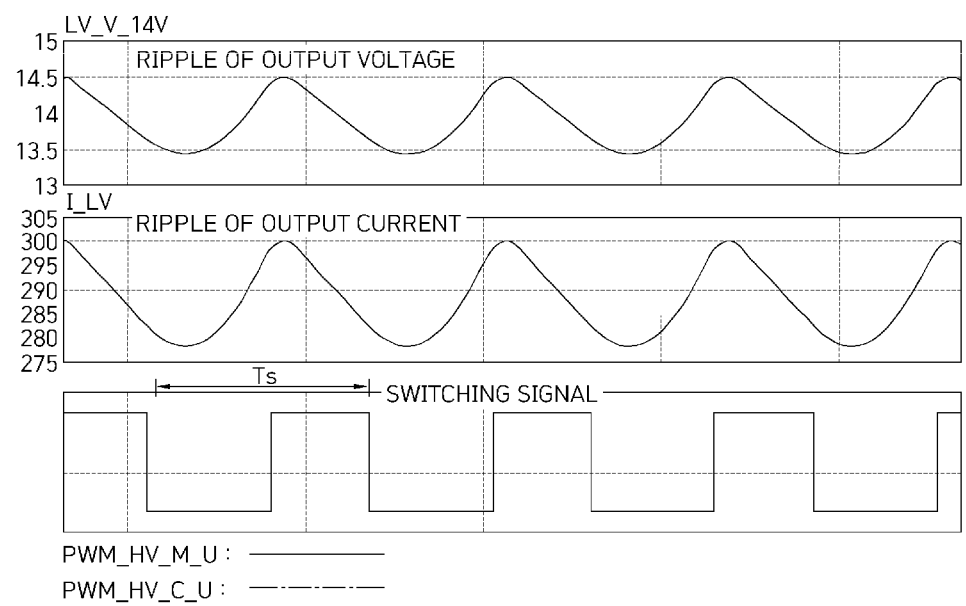
FIGS. 4A and 4B illustrate pulse width modulation (PWM) switching signals and ripple waveforms of an output voltage (LV_V) and an output current (I_LV) of a low voltage stage in a buck mode of a conventional single-type active-clamp flyback converter.
Figure 4B:
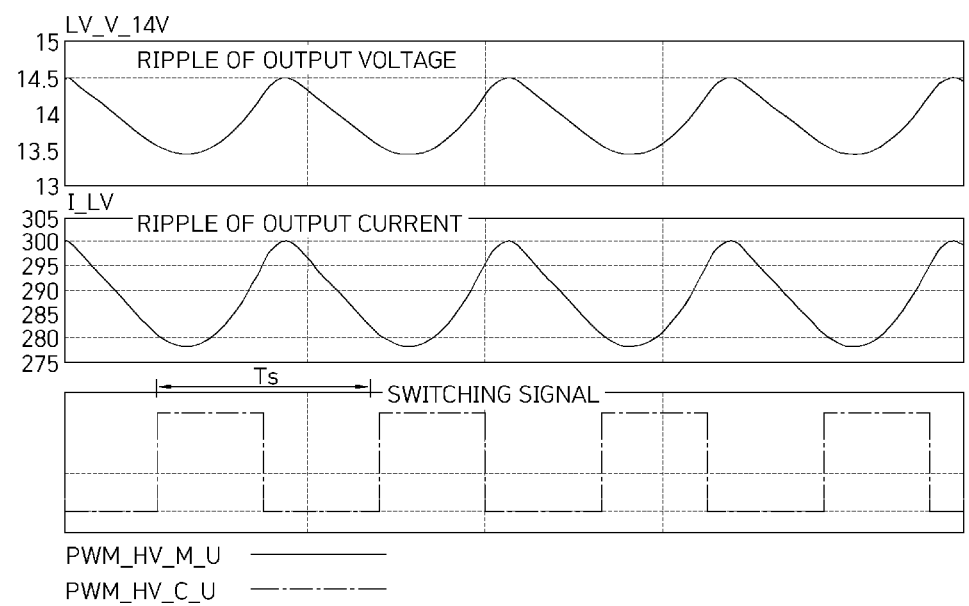
Figure 5A:
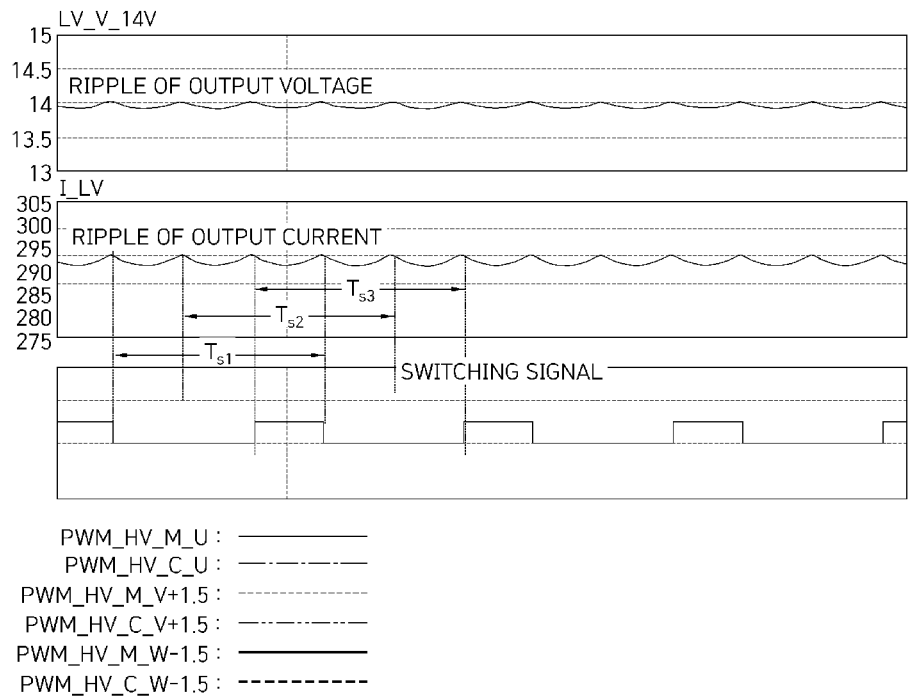
FIGS. 5A to 5F illustrate PWM switching signals and ripple waveforms of an output voltage (LV_V) and an output current (I_LV) of a low voltage stage in a buck mode of three parallel active-clamp flyback converters according to an embodiment of the present disclosure.
Figure 5B:
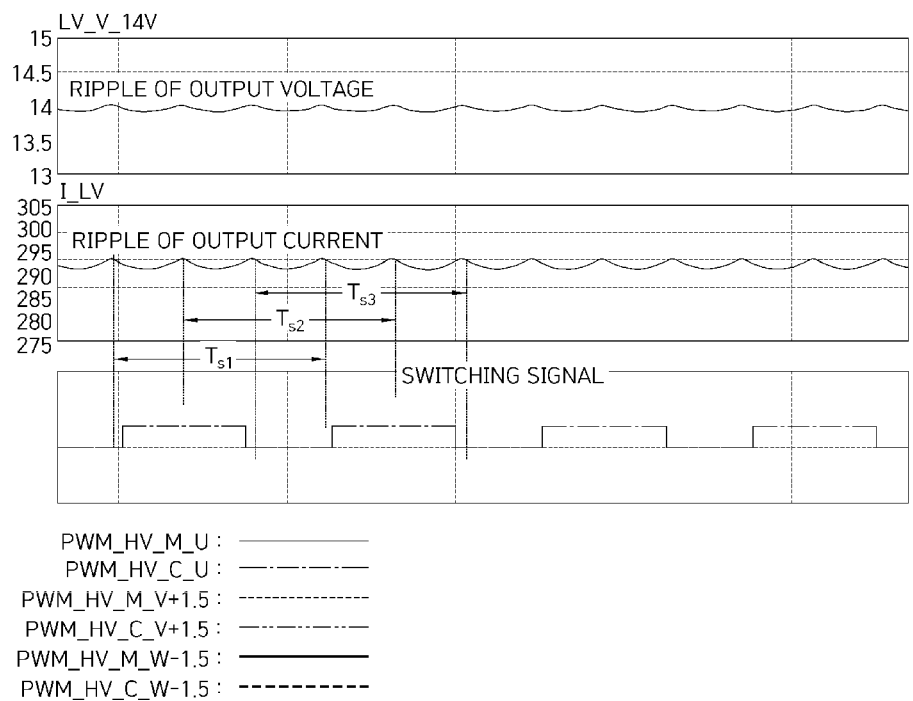
Figure 5C:
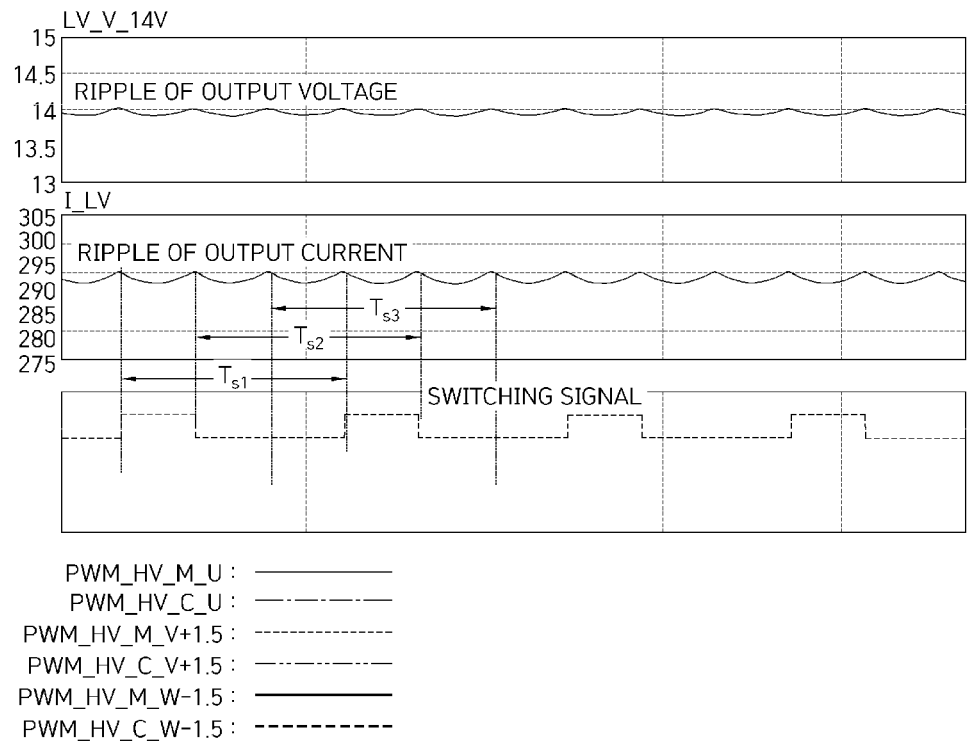
Figure 5D:
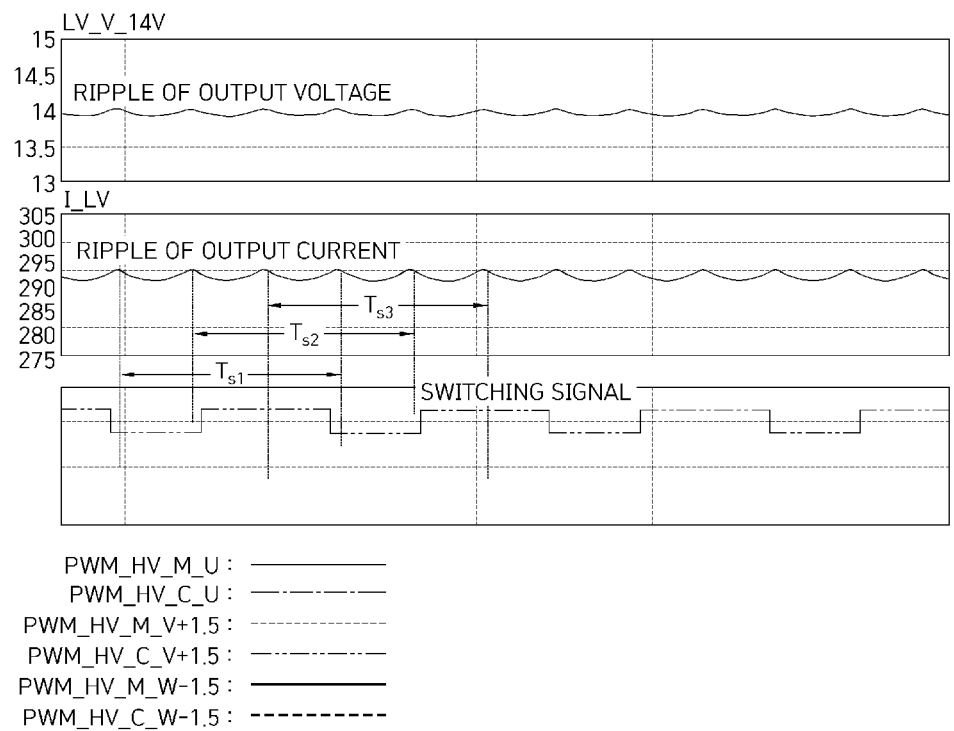
Figure 5E:
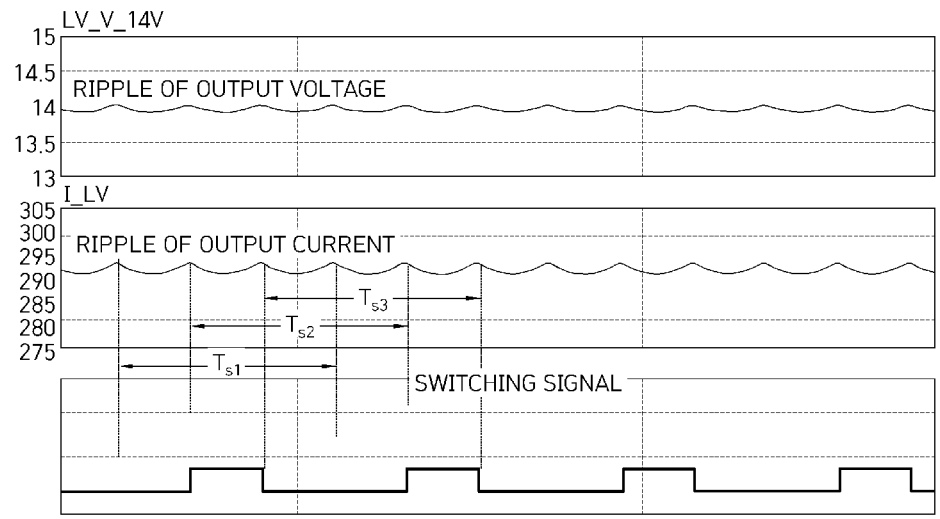
Figure 5F:
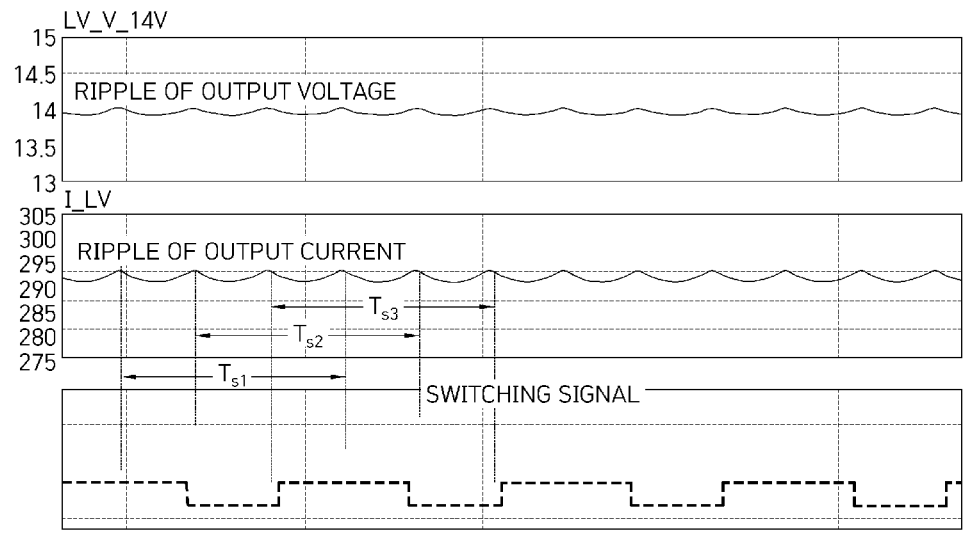

FIGS. 4A and 4B illustrate pulse width modulation (PWM) switching signals and ripple waveforms of an output voltage LV_V and an output current I_LV of a low voltage stage in a buck mode of a conventional single-type active-clamp flyback converter. For comparison, FIGS. 5A to 5F illustrate PWM switching signals and ripple waveforms of an output voltage LV_V and an output current I_LV of a low voltage stage in a buck mode of three parallel active-clamp flyback converters according to an embodiment of the present disclosure.

In FIGS. 4A and 4B, it can be seen that the PWM switching signal of a power semiconductor is provided as one phase during one switching period Ts to switch the power semiconductor, and ripples of the output voltage and the output current are relatively great due to the characteristics of a flyback converter topology. On the other hand, in FIGS. 5A to 5F, the PWM switching signals of power semiconductors are provided as three phases for converters 10, 20, and 30 such that switching periods Ts1, Ts2, and Ts3 partially overlap each other, thereby switching the power semiconductors of the converters 10, 20, and 30. A switching signal for interleaving is provided by a program of a microcomputer.

As described above, it can be seen that, by using three parallel interleaving control, ripple values of an output voltage and an output current are significantly lowered even with the same topology and the same output filter. Since an output voltage of an LDC is used to supply power to electrical components of a vehicle, a specification of a ripple size is limited to a small value. A ripple can be reduced to be sufficiently lowered from a required specification, the number of output capacitors can be reduced, thereby reducing material costs.

Figure 6:
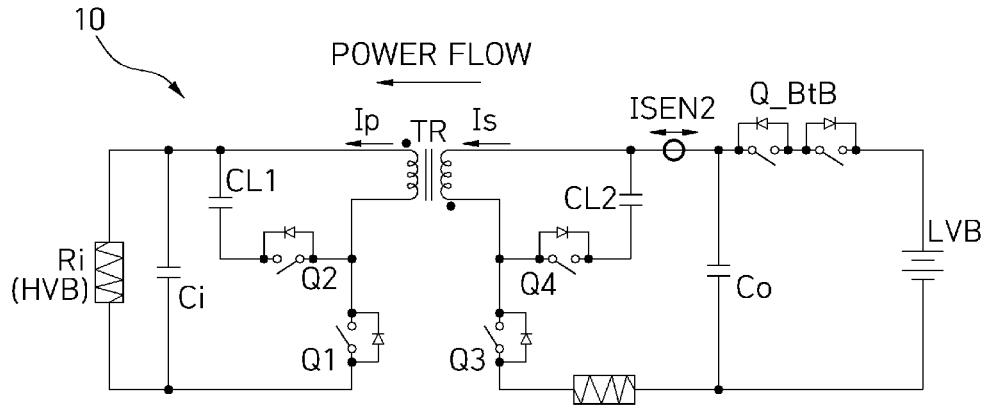
FIG. 6 is a circuit diagram of one converter (10) among three parallel-connected converters when the parallel interleaving operated bidirectional LDC according to the embodiment illustrated in FIG. 1 operates in a boost mode.

FIG. 6 is a circuit diagram of one converter 10 among three parallel-connected converters when the parallel interleaving operated bidirectional LDC according to the embodiment illustrated in FIG. 1 operates in a boost mode (and is a circuit diagram illustrating only core components of a circuit shown in FIG. 1). An arrow indicating "Power flow" is illustrated in a high voltage direction at an upper side to indicate that a boost power conversion mode is performed.

A boost mode operation is an operation in which a low voltage power is received, the received power is subjected to a power conversion process in a circuit inside the LDC, and a voltage thereof is boosted to a high voltage (with a level of 400 V) to output the power. As illustrated in FIG. 6, a power of the LDC is applied from a low voltage battery LVB during the boost mode operation. A current of a low voltage stage is detected through the sensor ISEN2 and used to control an input current. Contrary to a buck mode, Q3 and Q4 at the lower voltage stage complementarily operate while having a dead-time so that an AC is transmitted to a transformer TR and magnetization energy stored in the transformer TR flows through a power semiconductor Q1 at a high voltage stage and generates a DC voltage together with an output capacitor Co. During a boost mode, Q2 remains in a turned-off state.

Figure 7:
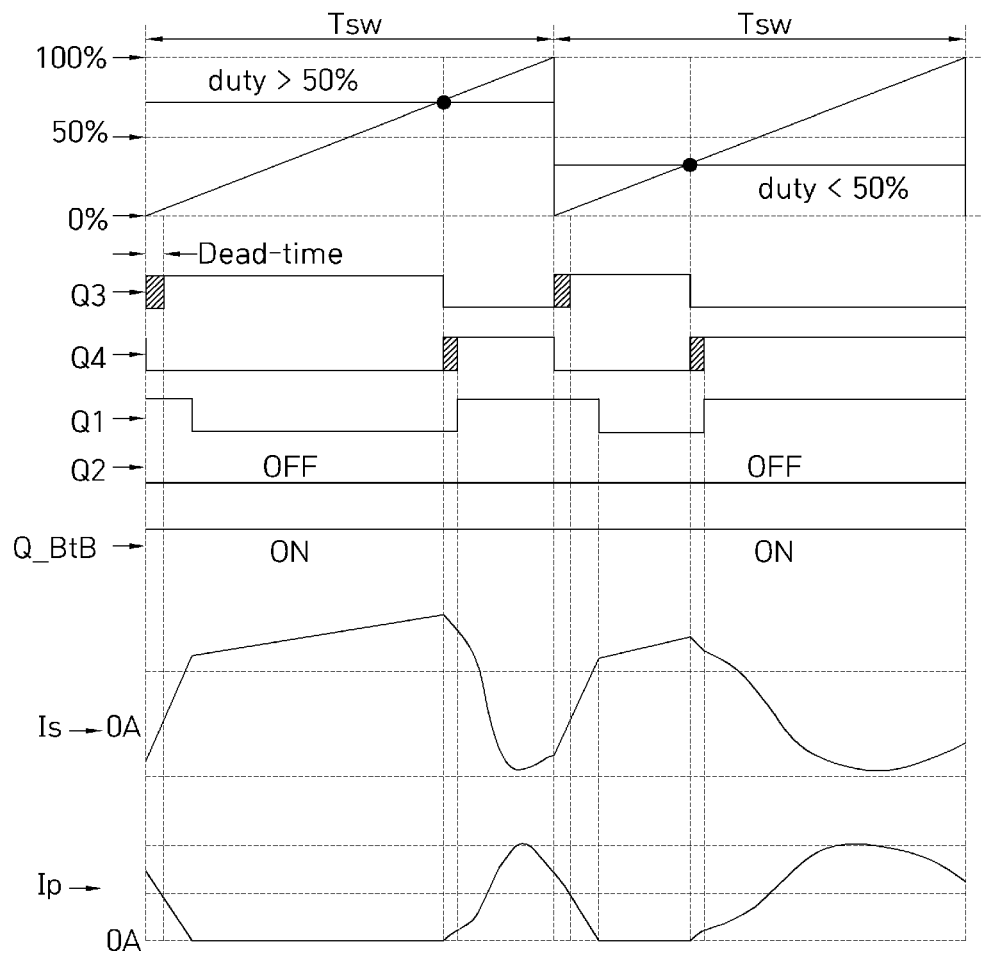
FIG. 7 illustrates an operation timing and current values (Is) and (Ip) of each power semiconductor of FIG. 6.

An operation timing and current values Is and Ip of each power semiconductor are illustrated in FIG. 7. Since an operation is possible even at a duty of 50% or more of Tsw, a wide input voltage range can be provided when being designed in consideration of a current. As in a voltage dropping circuit, Q1 is used for synchronous rectification control, and a switching time of Q1 is controlled to be later than that of Q4 in order to maximize efficiency.

Figure 8A:
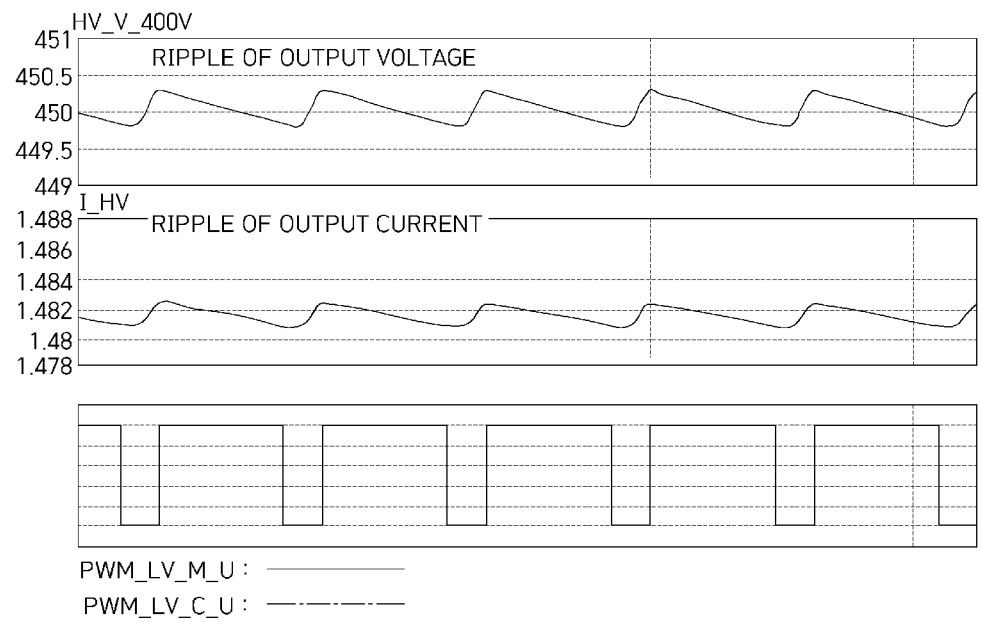
FIGS. 8A and 8B illustrate PWM switching signals and ripple waveforms of an output voltage (HV_V) and an output current (I_HV) of a high voltage stage in a boost mode of a conventional single-type active-clamp flyback converter.
Figure 8B:
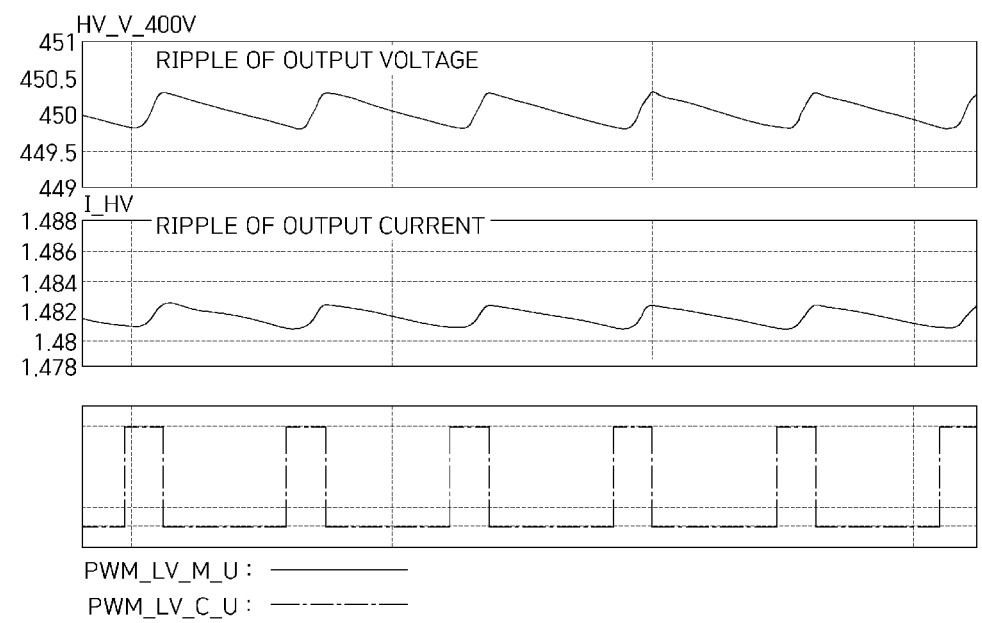
Figure 9A:
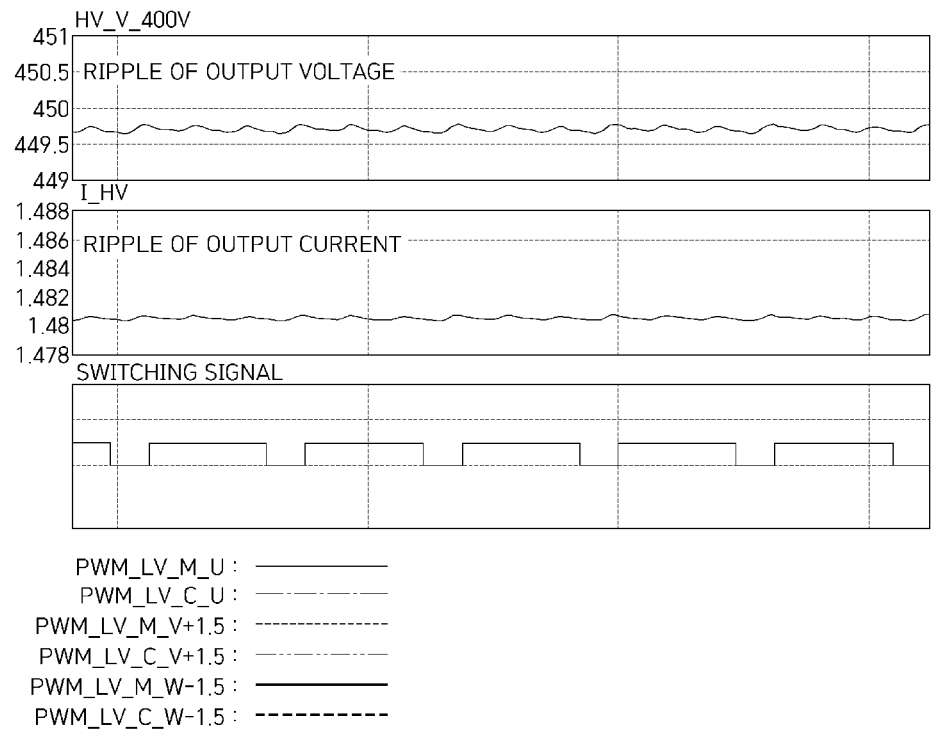
FIGS. 9A to 9F illustrate PWM switching signals and ripple waveforms of an output voltage (HV_V) and an output current (I_HV) of a high voltage stage in a boost mode of three parallel active-clamp flyback converters according to an embodiment of the present disclosure.
Figure 9B:
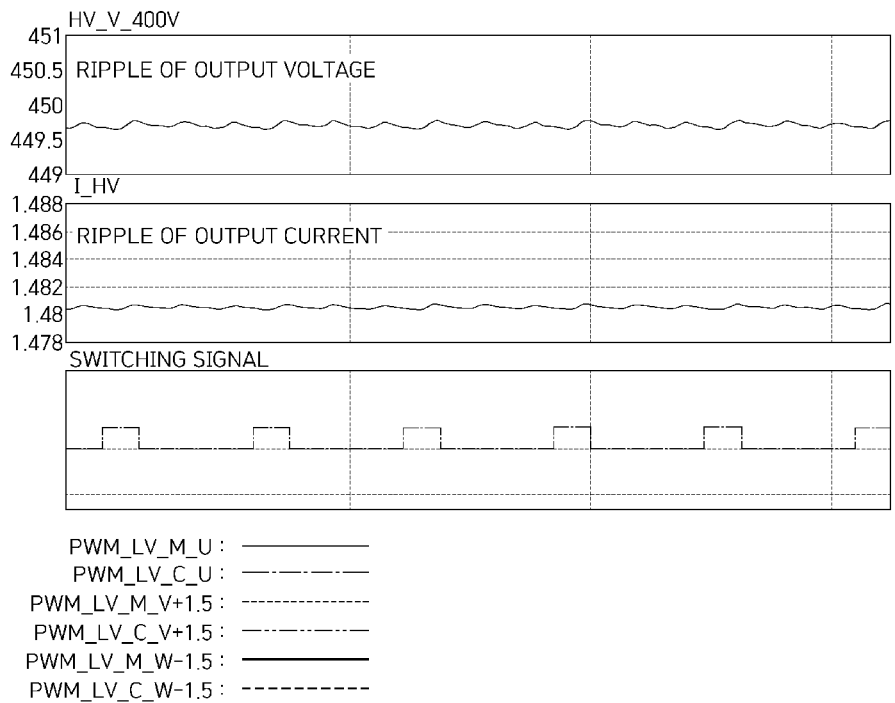
Figure 9C:
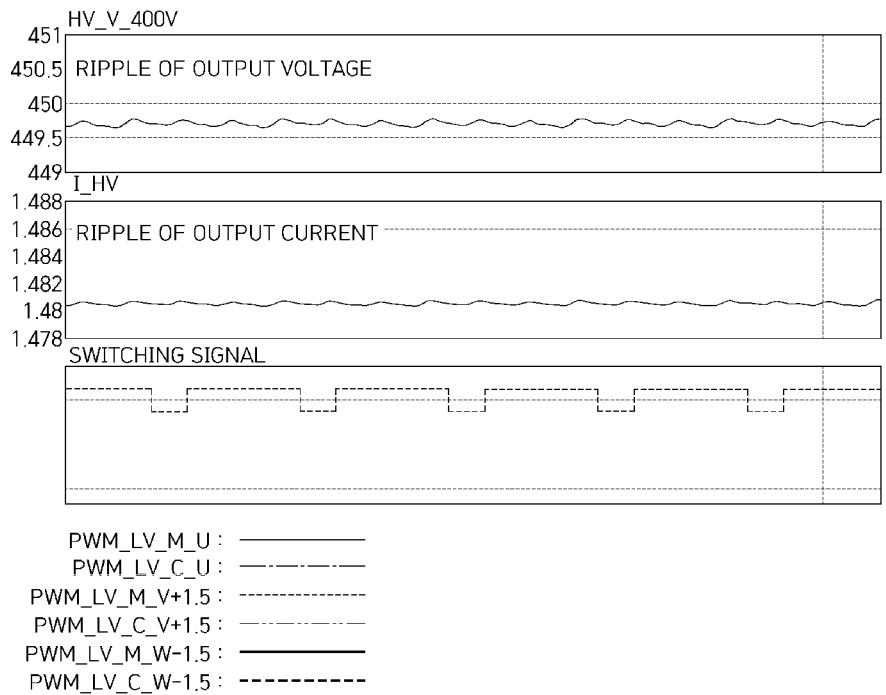
Figure 9D:
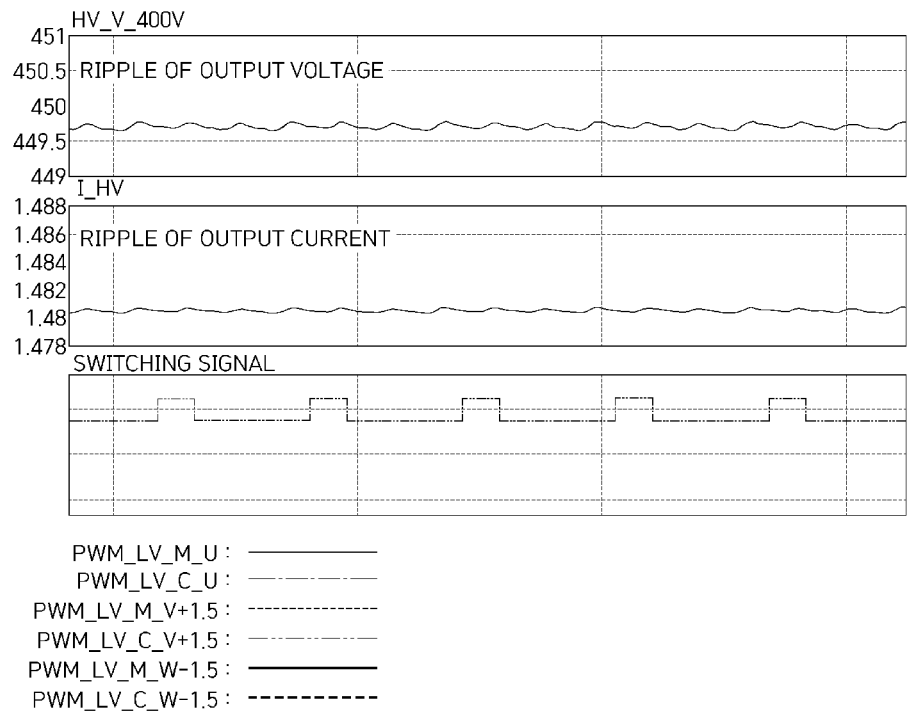
Figure 9E:
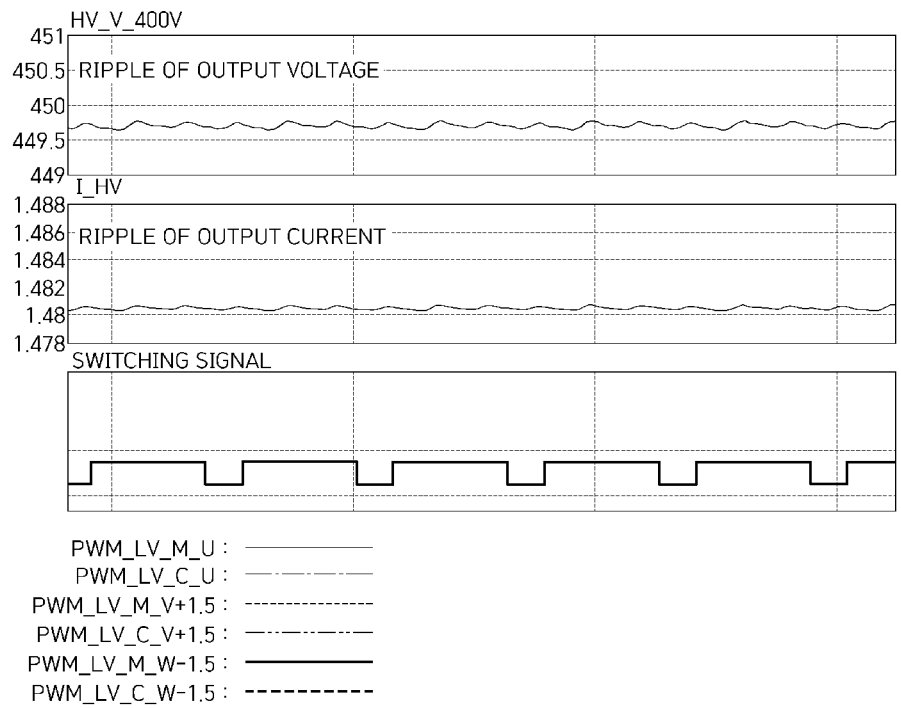
Figure 9F:
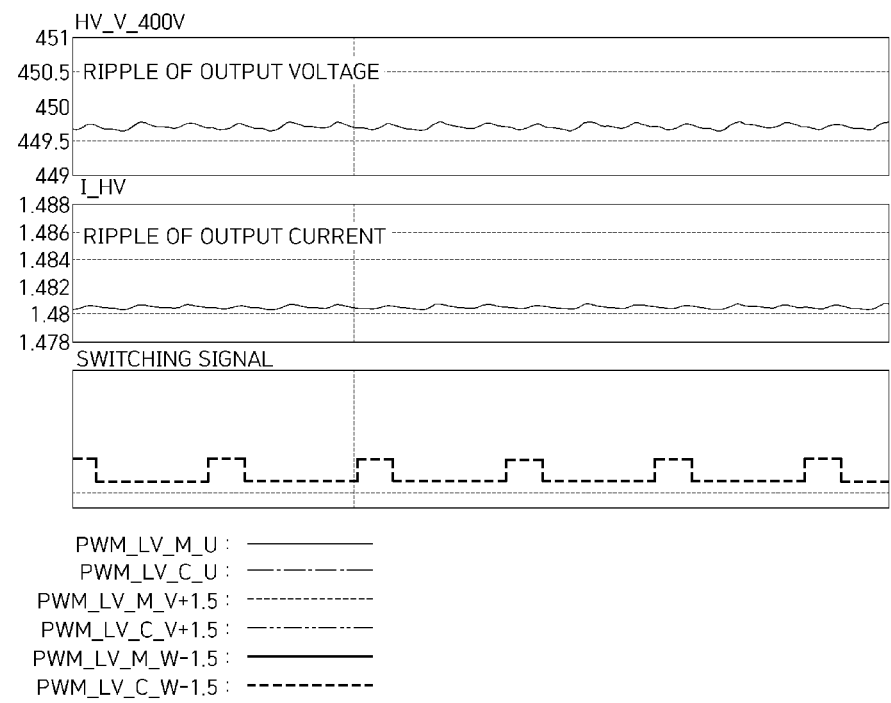

FIGS. 8A and 8B illustrate PWM switching signals and ripple waveforms of an output voltage HV_V and an output current I_HV of a high voltage stage in a boost mode of a conventional single-type active-clamp flyback converter. For comparison, FIGS. 9A to 9F illustrate PWM switching signals and ripple waveforms of an output voltage HV_V and an output current I_HV of a high voltage stage in a boost mode of three parallel active-clamp flyback converters according to an embodiment of the present disclosure. Switching signals for an interleaving operation of three parallel converters are provided by a program of a microcomputer as described with reference to FIGS. 4A, 4B and FIGS. 5A to 5F.

Regarding the ripple waveforms of FIGS. 8A and 8B, it can be seen that the ripples of the output voltage and the output current are great during boosting of a voltage due to the characteristics of a typical flyback converter topology. However, as can be seen from the ripple waveforms of FIGS.

9A to 9F, by using three-parallel interleaving control of the present disclosure, ripple values of the output voltage and the output current can be lowered during boosting of a voltage even with the same topology and the same output filter.

In an LDC proposed in the present disclosure, since a plurality of converters (for example, three converters) are subjected to a parallel interleaving operation so as to compensate for the disadvantages of the above-described active-clamp flyback converter, even when one converter fails, the remaining converters can be designed to perform essential functions, and also, whether a specific converter fails can be easily checked by comparing detected current and voltage values of the converters. Therefore, the LDC may be a solution that is suitable for an LDC with the highest safety level. In addition, ripples of an output current and an output voltage are reduced through parallel interleaving of a plurality of converters, thereby greatly improving power conversion performance.

The present disclosure has been described in detail with reference to the exemplary embodiments of the present disclosure, but those skilled in the art will understand that the present disclosure may be implemented in another specific form different from the content disclosed in this specification without changing the technical spirit or an essential feature of the present disclosure. Thus, it is to be appreciated that the embodiments described above are intended to be illustrative in every sense and not restrictive. The scope of the present disclosure is represented by the claims to be described below rather than the detailed description, and it is to be interpreted that the scope of the claims and all the changes or modified forms derived from the equivalents thereof are included in the scope of the present disclosure.

What is claimed is:

1. A parallel interleaving operated bidirectional DC-DC converter which is a low voltage DC-DC converter (LDC) as a direct current power supply device for a vehicle, the converter comprising
    two or more bidirectional DC-DC converters connected in parallel between a first battery and a second battery, a discharge voltage of the first battery being relatively higher than that of the second battery,
    each of the bidirectional DC-DC converters connected in parallel includes:
        a first current sensor configured to detect a current of a high voltage stage of each of the bidirectional DC-DC converters during the buck mode operation; and
        a second current sensor configured to detect a current of a low voltage stage of each of the bidirectional DC-DC converters during a bidirectional operation,
    wherein, among the bidirectional DC-DC converters, an interleaving operation is performed on switching of a power semiconductor included in one bidirectional DC-DC converter with respect to switching of power semiconductors included in other bidirectional DC-DC converters to perform a buck mode operation or a boost mode operation.

2. The parallel interleaving operated bidirectional DC-DC converter of claim 1, wherein the one bidirectional DC-DC converter is a bidirectional active-clamp flyback converter.

3. The parallel interleaving operated bidirectional DC-DC converter of claim 1, wherein an interleaving control of the bidirectional DC-DC converters connected in parallel is performed by a microcomputer.

4. The parallel interleaving operated bidirectional DC-DC converter of claim 1, wherein each of the bidirectional DC-DC converters connected in parallel includes:
    a high voltage stage protection fuse configured to, when the one bidirectional DC-DC converter fails, separate the one bidirectional DC-DC converter from the other bidirectional DC-DC converters; and
    a low voltage stage protection fuse configured to, when the one bidirectional DC-DC converter fails, separate the one bidirectional DC-DC converter from the other bidirectional DC-DC converters.

5. The parallel interleaving operated bidirectional DC-DC converter of claim 1, wherein each of the bidirectional DC-DC converters includes a low voltage stage protection power semiconductor which, when a low voltage stage of the one bidirectional DC-DC converter fails, is turned off to protect a circuit of the low voltage stage and separates the failed bidirectional DC-DC converter from the other bidirectional DC-DC converters.

6. A method of controlling two or more parallel interleaving operated bidirectional DC-DC converters which are connected in parallel between a first battery and a second battery, a discharge voltage of the first battery being relatively higher than that of the second battery, the method comprising
    performing an interleaving operation on switching of a power semiconductor included in one bidirectional DC-DC converter with respect to switching of power semiconductors included in other bidirectional DC-DC converters among the bidirectional DC-DC converters to perform a buck mode operation or a boost mode operation,
    wherein each of the bidirectional DC-DC converters connected in parallel includes:
        a first current sensor configured to detect a current of a high voltage stage of each of the bidirectional DC-DC converters during the buck mode operation; and
        a second current sensor configured to detect a current of a low voltage stage of each of the bidirectional DC-DC converters during a bidirectional operation.

7. The method of claim 6, wherein an interleaving control of the bidirectional DC-DC converters connected in parallel is performed by a microprogram.

8. The method of claim 6, further comprising, when the one bidirectional DC-DC converter of the bidirectional DC-DC converters connected in parallel fails, separating the one bidirectional DC-DC converter from the other bidirectional DC-DC converters.

9. The method of claim 6, further comprising checking whether any bidirectional DC-DC converter of the bidirectional DC-DC converters connected in parallel fails using detected current and voltage values of each of the bidirectional DC-DC converters.

10. The method of claim 6, further comprising:
    detecting whether a low voltage stage of any one of the bidirectional DC-DC converters fails to protect a circuit of a high voltage stage thereof; and
    separating the failed bidirectional DC-DC converter from other bidirectional DC-DC converters among the bidirectional DC-DC converters.

11. An apparatus for controlling two or more parallel interleaving operated bidirectional DC-DC converters which are connected in parallel between a first battery and a second battery, a discharge voltage of the first battery being relatively higher than that of the second battery, the apparatus comprising a microcomputer configured to perform an interleaving operation on switching of a power semiconductor included in one bidirectional DC-DC converter with respect to switching of power semiconductors included in other bidirectional DC-DC converters among the bidirectional DC-DC converters to perform a buck mode operation or a boost mode operation, each of the bidirectional DC-DC converters connected in parallel includes:
- a first current sensor configured to detect a current of a high voltage stage of each of the bidirectional DC-DC converters during the buck mode operation; and
- a second current sensor configured to detect a current of a low voltage stage of each of the bidirectional DC-DC converters during a bidirectional operation.

12. The apparatus of claim 11, wherein the microcomputer includes a microprogram for an interleaving control of the bidirectional DC-DC converters connected in parallel.

13. The apparatus of claim 11, wherein the microcomputer is further configured to, when the one bidirectional DC-DC converter of the bidirectional DC-DC converters connected in parallel fails, separate the failed bidirectional DC-DC converter from the other bidirectional DC-DC converters.

14. The apparatus of claim 11, wherein the microcomputer is further configured to check whether any one of the bidirectional DC-DC converters fails by receiving detected current and voltage values of each of the bidirectional DC-DC converters.

15. The apparatus of claim 11, wherein the microcomputer is further configured to detect whether a low voltage stage of any one of the bidirectional DC-DC converters fails to protect a circuit of a high voltage stage thereof and separate the failed bidirectional DC-DC converter from other bidirectional DC-DC converters among the bidirectional DC-DC converters.

16. The parallel interleaving operated bidirectional DC-DC converter of claim 1, wherein the two or more bidirectional DC-DC converters have the same power circuit topology.

17. The parallel interleaving operated bidirectional DC-DC converter of claim 1, comprising not more than three bidirectional DC-DC converters.

* * * * *